Dec. 31, 1957   B. C. MUZZEY ET AL   2,817,974
RATE GYROS
Filed Dec. 13, 1954   3 Sheets-Sheet 1
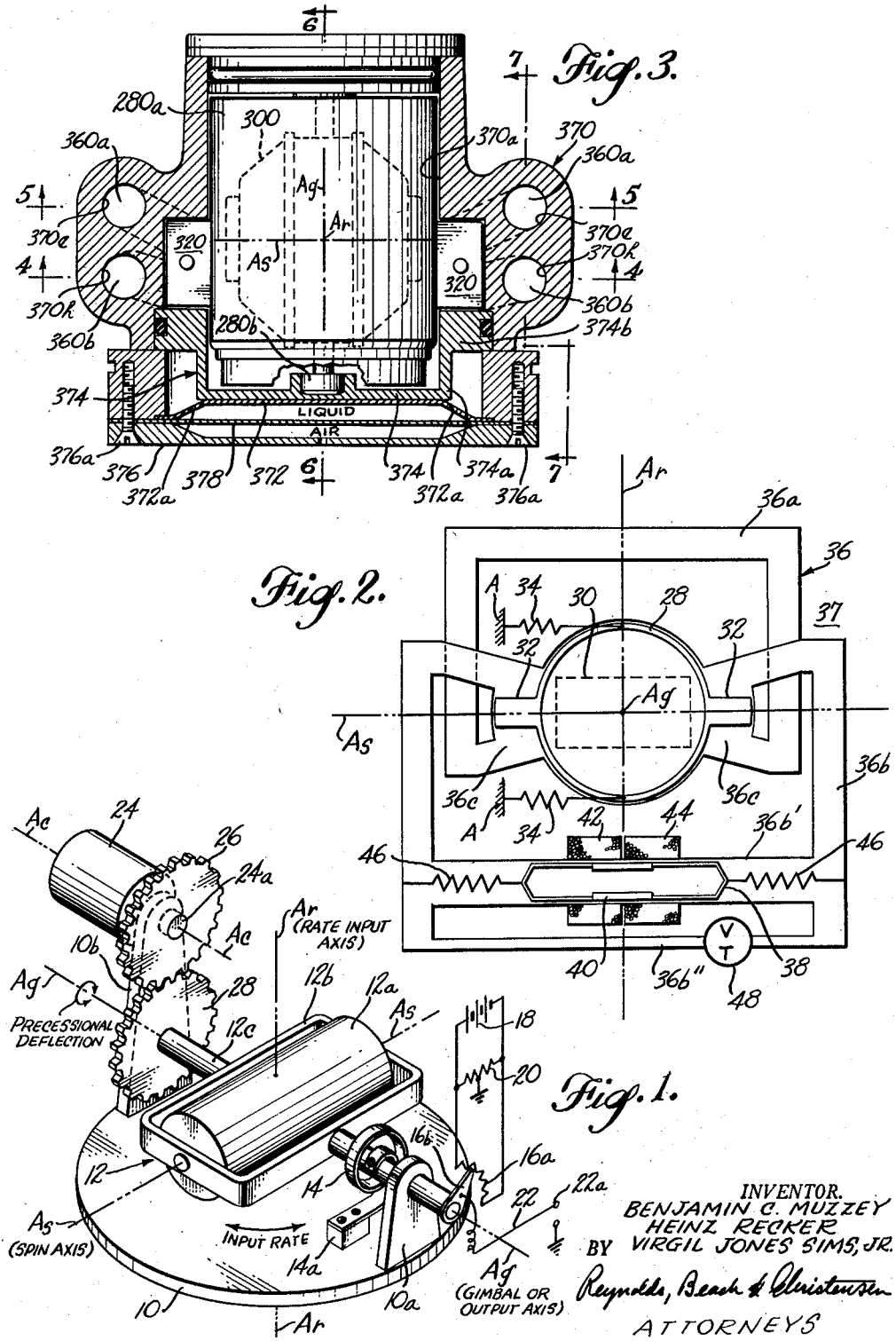
INVENTOR.
BENJAMIN C. MUZZEY
HEINZ RECKER
BY VIRGIL JONES SIMS, JR.
ATTORNEYS Dec. 31, 1957   B. C. MUZZEY ET AL   2,817,974
RATE GYROS Filed Dec. 13, 1954   3 Sheets-Sheet 2

INVENTORS.
BENJAMIN C. MUZZEY
HEINZ RECKER
VIRGIL JONES SIMS, JR.
BY Reynolds, Beach & Christensen
ATTORNEYS

INVENTORS.
BENJAMIN C. MUZZEY
HEINZ RECKER
BY VIRGIL JONES SIMS, JR.

Reynolds, Beach & Christensen
ATTORNEYS

United States Patent Office 2,817,974
Patented Dec. 31, 1957

2,817,974

RATE GYROS

Benjamin C. Muzzey, Mercer Island, and Heinz Recker and Virgil Jones Sims, Jr., Seattle, Wash., assignors to Boeing Airplane Company, Seattle, Wash., a corporation of Delaware Application December 13, 1954, Serial No. 474,648

7 Claims. (Cl. 74—5.4)

This invention relates to rate gyros and particularly to improvements therein permitting the important operating characteristics of such instruments to be determined or established separately and independently of each other. The invention is herein illustratively described by reference to its presently preferred forms as shown in the accompanying drawings; however, it will be recognized that the novel features involved have wider application and may assume varying forms.

A rate gyro functions to provide an indication or output signal (usually electrical) which constitutes a measure of the angular rate at which the instrument base is being turned about a predetermined rate input axis, i. e. that axis which is perpendicular to both the gyro spin axis and the gimbal axis. A gimbal spring or equivalent means resisting precession of the gyro deflects proportionally to the input angular rate. Such deflection thereby constitutes a measure of the input rate which may merely be indicated or which may be converted into a physical response by any suitable means herein designated the transducer.

In a conventional rate gyro the moment of inertia of the gimbal assembly (including the gimbal, the gyro wheel and all parts which precess therewith) about the gimbal axis directly affects the angular acceleration sensitivity of the instrument about such axis (i. e. the tendency for the gyro assembly not to follow the instrument case when the latter is tilted about the gimbal axis), and it also directly affects the natural period of the gimbal assembly and thereby the pass band of the instrument. The pass band is also directly affected by the degree of stiffness of the gimbal (antiprecession) spring. The stiffness of the gimbal spring also directly affects precessional deflection of the gimbal assembly about the gimbal axis as a function of input angular rates to be measured.

It has long been apparent from the above considerations that the performance characteristics of conventional rate gyros are interdependent and that changing one such characteristic would necessarily result in a related change in a different characteristic thereof. Thus an attempt to increase the natural period hence decrease the pass band of the conventional rate gyro would also either increase the angular acceleration sensitivity of the instrument about the gimbal axis or increase the angular rate sensitivity of the instrument about the axis mutually perpendicular to the gimbal and input axes or a combination of both and thereby increase any error or false rate component in the output signal. Conversely, an attempt to reduce such angular acceleration sensitivity of the instrument would result in a reduction of the natural period of the gimbal assembly; and in order to restore the original natural period it would then be necessary to decrease the stiffness of the gimbal spring. This latter means of compensation can be used only to a very limited extent because of the impairment of accuracy of the instrument resulting from an excessively weak gimbal spring permitting excessive precessional deflections hence angular rate sensitivity of the instrument about the axis mutually perpendicular to the gimbal and rate input axes.

Because of the above-described interdependencies the designer of a conventional rate gyro for particular applications has a very limited choice in the selection of operating characteristics of the instrument. Moreover, it is not known in conventional rate gyros how to eliminate material operating error due to angular acceleration sensitivity of the instrument about the gimbal axis.

An object of the present invention is to achieve a type of rate gyro which affords a relatively wide range of independent choice of pass band and the cross-coupling coefficients of the instrument, and, secondly, which affords greater flexibility in the selection of a transducer for converting precessional deflection into output signal. The term "cross coupling coefficients" has reference to the angular acceleration sensitivity and gimbal deflection characteristics of the instrument.

More specifically it is an object of the invention to achieve an improved rate gyro wherein (1) degree of the stiffness of the gimbal spring may be selected primarily for maximum instrumental accuracy having regard to the type of transducer utilized and the effect of increasing precession deflection on the angular rate sensitivity of the instrument about the axis mutually perpendicular to the gimbal and rate input axes, (2) the pass band of the instrument may be independently selected for the requirements of a particular application, and (3) the angular acceleration sensitivity of the instrument may also be independently selected (or eliminated) in accordance with requirements of optimum design.

Another object of the invention is an improved rate gyro in which angular acceleration sensitivity may be greatly reduced or even eliminated, thereby permitting the gyro base or instrument case to be accelerated about the gimbal axis without accompanying angular movement of the gimbal assembly relative to such instrument case. In one aspect, therefore, the invention provides means compensating for the moment of inertia of the gimbal assembly about the gimbal axis in order partially or completely to eliminate angular acceleration sensitivity. In a practical case the invention permits stiffening the gimbal spring as desirable for purposes of increased instrumental accuracy, offsetting, more or less, the effect thereof on natural frequency of the instrument by effectively increasing the mass of the gimbal assembly to any desired extent, and at the same time, despite such increased mass, reducing or even eliminating angular acceleration sensitivity of the instrument.

A more specific object is an improved rate gyro achieving the foregoing objectives in a convenient and practicable form of instrument (1) which is not subject to a biased output as a result of changes in the null position of the gimbal caused, for instance, by gimbal spring hysteresis, (2) which incorporates an efficient means for producing a relatively large degree of transducer element displacement for a given slight amount of precessional deflection, thereby to permit utilizing highly accurate types of transducers heretofore impracticable in rate gyros, (3) which affords a practicable and convenient means for controlling the lower break frequency in the pass band of the instrument, and (4) which is inherently self-damped with a damping factor readily controlled or determined in the design and construction of the instrument.

The basic principles or theory upon which this invention is based may be understood by considering a gimbal assembly, in association with which there is provided a separate gyratory mass which is subject to gyration relative to the instrument case when the latter is subjected to angular acceleration about the gimbal axis, said mass having a predetermined moment of inertia about the gimbal axis (or an axis parallel thereto—it makes no difference) and being rotationally coupled to the mass of the gimbal assembly in a manner such that the inertial torque of such mass is exerted on the gimbal assembly oppositely to the latter's own inertial torque. In effect the separate gyratory mass therefore increases the effective moment of inertia of the gimbal assembly with respect to gyroscopic torque and reduces or eliminates the moment of inertia of the gimbal assembly with respect to angular acceleration of the instrument case about the gimbal axis. The result is a potential increase in the natural period accompanied by a reduction of the angular acceleration sensitivity of the instrument.

For example, in the case of gears as the rotational coupling means mentioned above, complete cancellation of angular acceleration sensitivity about the gimbal axis is accomplished when the product of the moment of inertia of the separate gyratory mass multiplied by the gear ratio (from the gimbal assembly to the gyratory mass) is equal to the corresponding moment of inertia of the gimbal assembly, assuming as specified above that the respective masses are geared for counter-rotation.

In the foregoing theoretical example it will be noted that the polar moment of inertia of the gyratory mass reduces the effective moment of inertia of the gimbal assembly with respect to acceleration of the instrument case about the gimbal axis i. e. reduces the angular acceleration sensitivity of the instrument as a linear function of the gear ratio. The gear ratio has a different effect on the degree to which the gyratory mass increases the moment of inertia of the gimbal assembly with respect to gyroscopically forced precessional acceleration. In this instance the amount of increase effected varies, not linearly but with the square of the gear ratio. Because of this difference it becomes possible to satisfy the conditions for complete cancellation or a predetermined reduction of angular acceleration sensitivity, while establishing any suitable natural frequency or pass band characteristic. For the same reason it is also possible to achieve a given pass band characteristic or natural frequency with different gimbal spring constants. Thus, it becomes possible to design an instrument with zero angular acceleration sensitivity, a selected natural period and an independently selected precessional deflection characteristic.

In accordance with this invention the principles described above by reference to a gearing arrangement are applied to the theoretically analogous arrangement of a gyratory liquid mass constrained to flow in a circuit so disposed with relation to the gimbal axis that angular acceleration of the instrument case relative to such axis tends to produce displacement of the liquid relative to the instrument casing. The liquid mass is counter-rotationally coupled to the gimbal assembly by positive displacement pump means preferably in the form of one or more vanes on the gimbal intercepting the gyratory flow path of the liquid. By means of flow-reversing connections in the liquid path, gyratory flow pressures in the circuit are applied differentially to opposite sides of the vanes in a sense producing acceleration torque opposition as between the liquid mass and the mass of the gimbal assembly. Thus a gimbal deflection produces a corresponding but opposite displacement of the liquid mass.

In this embodiment the cross section of the liquid circuit to the area of the vanes subjected to liquid flow pressures is the counterpart of the gear ratio in the first example.

In this embodiment proper choice of vane area and the average moment arm of the liquid mass about its gyrational axis (illustrated as coincident with the gimbal axis) will result in substantially complete cancellation of gimbal axis acceleration sensitivity of the instrument. Thus when the instrument case accelerates about the gimbal axis the liquid mass and the gimbal both accelerate with it. The transducer therefore registers no false precessional displacement. It may be shown that the cross-sectional area of the flow path does not determine the condition for eliminating angular acceleration sensitivity. However, such cross-sectional area and the average radius of gyration thereof both directly affect the natural frequency of the instrument. Therefore, the active surface area of the vanes and the average radial distance of the flow path from the axis of gyration can be chosen to satisfy the conditions for eliminating angular acceleration sensitivity of the instrument and at the same time the natural frequency of the instrument may be established at any selected value within a wide range.

In this embodiment the transducer comprises a differential transformer core element carried by a float interposed in the liquid circuit and displaced from neutral position against return springs by displacement of the liquid in such circuit. Controlled by-pass of the liquid in such circuit may be used as a basis for establishing the lower cut-off frequency in the pass band of the instrument, thereby causing the same to reject, more or less, rate input frequencies below a selected value. Moreover, a relatively great deflection of the transducer element for a given restricted precessional displacement of the gimbal assembly may be attained for achieving maximum instrumental accuracy. Also contributing to increased accuracy is the possibility of utilizing a type of transducer having inherently good accuracy.

These and other features, objects and advantages of the invention will become more fully evident from the following description thereof by reference to the accompanying drawings.

Figure 1 is a diagrammatic representation illustrating the basic principle of the improved rate gyro by an arrangement utilizing gear coupling between the gimbal assembly and the separate gyratory mass.

Figure 2 is a schematic diagram illustrating the principles of the invention.

Figure 3 is a horizontal cross-sectional view of a practical embodiment of the invention, taken on line 3—3 in Figure 5.

Figure 4:
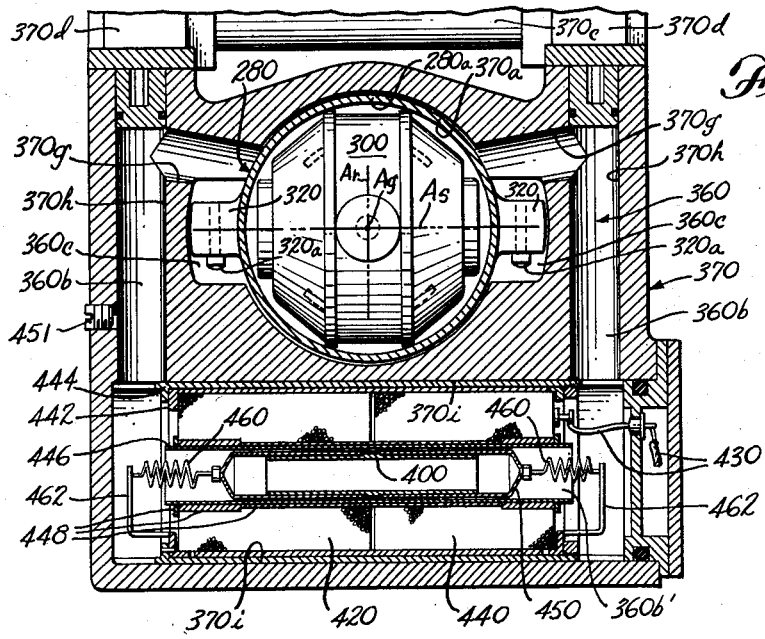
Figure 4 is a vertical cross-sectional view of the device taken on line 4—4 in Figure 3.
Figure 5:
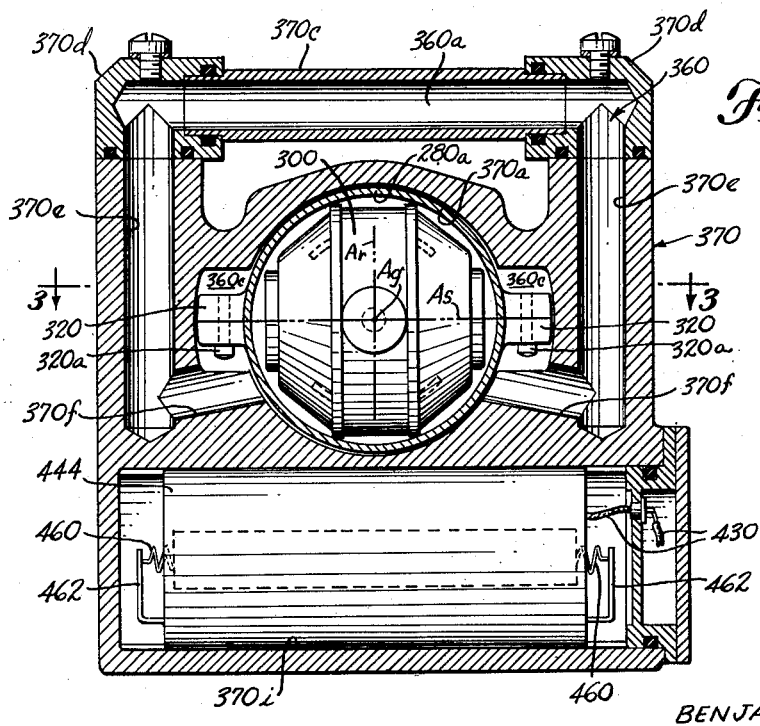
Figure 5 is a similar view taken on line 5—5 in Figure 3.

Referring to Figure 1, the basic functional elements of a rate gyro by which certain principles on which the invention is based are illustrated symbolically to facilitate visualization of the operating principles involved. The base or instrument case is represented by the flat circular plate 10. The rate input axis $A_r$ is the central axis of this plate. Input angular rates of rotation of the base 10 about this axis are to be measured by the instrument. The gimbal assembly 12 comprising the gyroscopic element 12a supported in the gimbal 12b is journaled on the gimbal assembly shaft 12c in journal blocks 10a and 10b projecting upwardly from opposite sides of the base plate 10. The gyroscopic element 12a rotates on a spin axis $A_s$ perpendicular to the gimbal axis $A_g$, and in the normal rest position of the gimbal assembly the common plane defined by the spin axis $A_s$ and the gimbal or output axis $A_g$ is perpendicular to the input axis $A_r$. The gimbal or output axis $A_g$ represents the precessional axis of the gimbal assembly when the base 10 is turned about axis $A_r$. Precessional deflection of the gimbal assembly about axis $A_g$ will occur in one direction for one direction of angular motion of the base 10 about axis $A_r$ and will occur in the opposite sense for the opposite direction of angular motion of the base 10 about such axis. Precessional deflection of the gimbal assembly is resisted in either direction by the antiprecession or gimbal spring represented in the form of the spiral spring 14 anchored at one end to the gimbal shaft 12c and at its opposite end to the base 10 by means of a connecting block 14a. A spring is preferred as the antiprecessional restraining means in most rate gyros, but in a larger sense is used herein as the equivalent of any suitable means by which precessional deflection is resisted with progressively increasing restoring force.

Assuming a linear system, that is a linear relationship between precessional torque and input rate throughout deflection of spring 14, the actual precessional deflection of the gimbal assembly 12 about axis $A_g$ will constitute a direct measure of the input rate. Such deflection may merely be indicated or it may be converted into suitable output response or signal such as a voltage or current by any appropriate transducer means. In the example, such a transducer is symbolized by the potentiometer winding 16a contacted by the rotatable wiper 16b fixedly mounted on the end of the gimbal shaft 12c, so that the position of the wiper along the winding varies directly with precessional deflection of the gimbal assembly. The ends of the winding 16a are connected to opposite terminals of a voltage source 18, and the circuit is balanced with respect to ground by connecting a mid-tapped resistor 20 between these terminals, the mid-tap connection being grounded. The output signal from this transducer is then derived from the wiper 16b by a conductor 22 and appears between the output terminal 22a and ground. The magnitude of the voltage appearing between terminal 22a and ground is a measure of precessional deflection of the gimbal assembly, whereas the polarity of this voltage is representative of the direction or sense of the input rate.

As thus far described, the diagram shown in Figure 1 is also representative of a conventional rate gyro. Assuming it to be such, it will be recognized from the diagram that angular acceleration sensitivity of the instrument about the gimbal axis $A_g$ arises from the moment of inertia of the gyro assembly 12 preventing such gyro assembly from following angular motion of the base 10 about such axis. When such acceleration takes place a false rate indication component occurs in the output potential at terminal 22a due to relative angular displacement between the gimbal assembly and the base, which has no relationship with the actual input rate being measured about input axis $A_r$. As previously mentioned, this angular acceleration sensitivity is not reduceable in simple rate gyros except at a sacrifice in pass band or instrumental accuracy, or both, due to the interrelationship between the polar moment of inertia of the gimbal assembly and the stiffness of the gimbal spring and these operating characteristics.

The foregoing difficulties are overcome ideally in theory and substantially so in practice by the addition of a separate gyratory mass such as the cylindrical element 24 journaled in an extension of the base member 10b to rotate freely on an axis $A_c$ coincident with or parallel to the gimbal axis $A_g$, as shown. In general, the arrangement is such that angular acceleration of the base 10 about the gimbal axis $A_g$ results in a tendency for the gyratory element 24 to undergo rotational deflection relative to the base due to the moment of inertia of such element about its own gyratory axis $A_c$, just as the gimbal assembly 12 tends to undergo rotational deflection at the same time and for the same reasons. The respective moments of inertia of the gimbal assembly 12 and the gyratory element 24 to such angular acceleration of the base 10 are superimposed on each other in mutual opposition by counter-rotatively coupling the two masses together as by means of the meshing spur gears 26 and 28. The spur gear 26 is fixed on the journal shaft 24a of the gyratory element and the spur gear 28 is fixed on the gimbal assembly shaft 12c.

Considering the moment of inertia of the cylindrical element 24 to include that of its own mass and the mass of spur gear 26 and shaft 24a, and considering the moment of inertia of the gyro assembly to include the mass of its own parts and that of gear 28 connected thereto, certain observations are readily made with respect to the effect of these counter-rotating masses in a rate gyro. It may be shown first of all that the condition for eliminating angular acceleration sensitivity of the instrument is satisfied when the ratio of the diameter of gear 26 to the diameter of gear 28 is equal to the ratio of the moment of inertia of the separate gyratory mass (24, etc.) to the moment of inertia of the gimbal assembly (12, etc.). In view of this relationship the condition under which the separate gyratory mass 24 will prevent the gimbal assembly 12 from rotating relative to the base 10 when the latter is subjected to angular acceleration about gimbal axis $A_g$ can be satisfied by different combinations of gear ratios and relative masses or moments of inertia.

Likewise, the effect of the separate gyratory mass 24 on the natural frequency of the gimbal assembly 12 (i. e. the undamped resonant frequency of the gimbal assembly, including spring 14 under oscillatory stimulus thereof relative to the base 10) may be expressed in terms of the moments of inertia of the mass 24 and of the gimbal assembly, and the gear ratio. In this instance the resultant effective moment of inertia of the gimbal assembly is its own moment of inertia (including gear 28 and all elements forming a part of the gimbal assembly) plus the moment of inertia of the gyratory mass 24 times the square of the ratio of the diameter of gear 28 to the diameter of the gear 26. In other words, it is possible with a given stiffness or deflection coefficient of the gimbal spring 14 to produce any desired resonant or natural frequency of the gimbal assembly over a wide range by proper selection of the gear ratio and moment of inertia of gyratory element 24. Moreover, under these conditions a particular natural frequency may be established by selecting different combinations of gear ratio and relative moments of inertia of the element 24 and the gimbal assembly 12, respectively.

In view of the relationships expressed in the two next preceding paragraphs applicable to the novel rate gyro symbolized in Figure 1, it is evident that the condition for reducing by a given degree, or even eliminating, angular acceleration sensitivity of the instrument about axis $A_g$ may be satisfied by such a choice of values for the moments of inertia of gyratory element 24 and gimbal assembly 12 and for the gear ratio that the desired pass-band and related spring stiffness factor may also be achieved.

While a practical operative rate gyro incorporating a solid gyratory mass rotatively coupled through gearing, or equivalent counter-rotational coupling means, to the mass of the gimbal assembly may be constructed and will operate satisfactorily, certain distinct and unique advantages are achieved in accordance with this invention by utilization of a liquid gyratory mass constrained to flow in a circulatory path and coupled to the rate gyro gimbal assembly in a manner and by preferred means as hereinafter described.

Referring to Figure 2, the operating principle of the preferred embodiment is schematically illustrated utilizing similar notations for the related axes of the instrument as in Figure 1. In Figure 2 the gimbal axis $A_g$ is disposed perpendicular to the plane of the paper so that it appears as a point centrally situated in the gimbal assembly comprising the cylindrical member 28 within which the gyroscopic element 30 is suitably mounted and propelled to rotate about the spin axis $A_s$. For diagrammatic purposes the gimbal assembly includes the cylindrical member 28, all components including the gyroscopic element mounted within it, and the two vanes 32 projecting in an axial diametral plane of the cylindrical member from respectively opposite sides thereof. The projecting vanes are assumed to have flat upper and lower surfaces of predetermined area extending in substantially parallel planes perpendicular to the plane of the paper. The gimbal spring is represented in this instance in the form of two helical springs 34 connected at one end to a part of the casing as shown by the anchor symbol A, and at their opposite ends to points on respectively opposite sides of the periphery of the gimbal 28 so that the springs, preferably preloaded, exert equal and opposite torques on the gimbal assembly in the neutral position of the latter wherein the vanes extend in a horizontal plane with the illustrated attitude of the instrument, and exert progressively increasing net resistance to rotational deflection of the gimbal assembly relative to the instrument case about axis $A_g$ in either direction of displacement.

The instrument case 37 for the schematic rate gyro shown in Figure 2 also incorporates a gyratory flow path 36 for a mass of liquid contained therein. This flow path comprises an upper branch 36a, a lower branch 36b, chambers 36c in which the vanes 32 operate as positive liquid displacement vanes, and connecting portions between these chambers and the upper and lower branches of the flow path such that displacement of the vanes by clockwise deflection of the gimbal assembly 28 produces a corresponding but opposite (counterclockwise) displacement of the liquid around the fluid circuit 36. Fluid circuit 36 with its direction-reversing passages leading into the vane chambers 36c, as illustrated, is disposed in a plane which may be assumed to be parallel to the plane of the paper such that angular acceleration of the instrument casing 37 about gimbal axis $A_g$ will tend to result in gyration of the liquid within and relative to the casing. Of course, such gyratory movement of the liquid mass about the circuitous passage 36 tends to occur in the same sense relative to the casing as simultaneous gyration of the gimbal assembly 28 relative to the casing under the same conditions. However, the net inertial flow pressures developed in the liquid flow path accompanying angular acceleration of the casing about axis $A_g$ act on opposite surfaces of the vanes 32 in a sense to oppose the inertial torque of the gimbal assembly. By proper choice of the effective area of the vane surfaces subjected to such flow pressures and the average moment arm of the liquid mass about its gyrational axis (illustrated as coincident with axis $A_g$) substantially complete cancellation of gimbal axis acceleration sensitivity of the instrument is accomplished as in the previous case.

In this preferred embodiment, as previously mentioned, the circuit passage average cross-sectional area as well as the average radius of gyration or moment arm of the liquid mass about the gyrational axis $A_g$ affects the natural frequency of the instrument. The ratio of the average cross-sectional area of the liquid passage divided by the active area of the vanes against which flow pressures of the liquid are directed forms the counterpart of the gear ratio in the first example. In view of these relationships it will be seen that the active surface area of the vanes and the average radial distance of the liquid path from the axis of gyration thereof can be chosen to satisfy the condition for eliminating angular acceleration sensitivity of the instrument, and at the same time, taking also into consideration the average cross-sectional area of the liquid path, achieve a particular natural frequency or pass band in the instrument.

It should be noted both in Figures 1 and 2 that the gyrational axis of the separate gyratory mass which in the first instance comprises the cylindrical element 24 and in the second instance comprises the gyratory mass of liquid, need not be coincident with the gimbal axis; in fact, in Figure 1 it is not, but it is parallel thereto. The two situations are basically equivalent, since the inertial effect of angular acceleration of the base 10 on all freely rotatable elements is the same if the axes of such elements are parallel, and is a maximum if their axes are parallel to the axis about which such angular acceleration takes place.

Instead of mechanically coupling a transducer armature element directly to the gimbal assembly as in Figure 1, in Figure 2 the armature element is carried by a float 38 slidably fitted in one section of the liquid path, such as the straight cylindrical section of path 36b', to be displaced as a result of gyratory flow of the liquid in either direction in the flow path 36. Such transducer element in this instance is in the form of a differential transformer core comprising a ferromagnetic sleeve 40 centrally mounted on the nonferromagnetic float 38. Differential transformer windings 42 and 44 surround the tubular float passage 36b' in a generally intermediate position lengthwise thereof, and in the neutral position of the float 38, established by transducer return springs 46 connected to opposite ends of the float and to the casing, the transformer core 40 is centered with respect to the two transformer windings as illustrated. This neutral position of the transducer element 40 corresponds to the neutral position of the gimbal assembly 28 as illustrated in the figure. Counterclockwise precessional deflection of the gimbal assembly produces movement to the left of the transducer float 38 and clockwise deflection of the gimbal assembly produces reverse movement of the transducer float.

If the float 38 fits tightly within the passage 36b' the float will faithfully follow gyratory displacement of the liquid mass. Preferably, however, a by-pass 36b'' around the float passage is provided for the purpose of establishing a desired "break frequency" greater than zero at the lower end of the pass band of the instrument, so that the same will not respond to very slow changes in input rate being measured by the instrument. Restriction to flow through the by-pass 36b'' determines this break frequency and if desired may be varied as by means of a throttle valve 48 or other means. As a practical matter there is some leakage past the vanes 32 and slight leakage past the float 38 which act effectively like the by-pass 36b''. The instrument of Figure 2, therefore, is essentially a dynamic instrument capable of responding only to changes in input angular rate providing such changes take place more rapidly than a predetermined minimum frequency greater than zero determined by leakage past the float and vanes and by the opening through the by-pass 36b''. In the succeeding figures illustrating a practical form of the preferred embodiment, the throttle valve 48 is omitted and the instrument is designed to operate with a constant pass-band although by shimming or a like technique design errors may be corrected.

Figure 6:
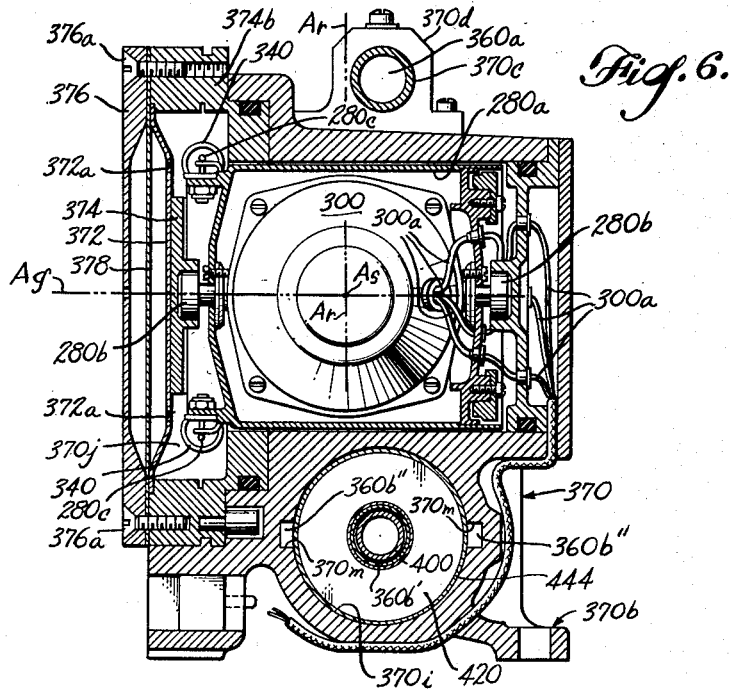
Figure 6 is a longitudinal sectional view taken on line 6—6 in Figure 3.
Figure 7:
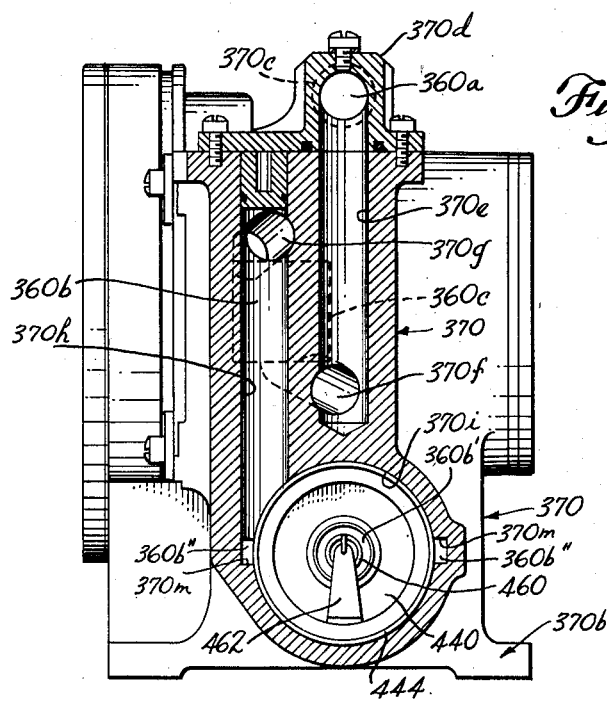
Figure 7 is a longitudinal sectional view taken on line 7—7 in Figure 3.

Referring now to Figures 3 through 7, parts which correspond functionally to those shown in Figure 2 are labeled with the same reference numerals multiplied by a factor of 10. The instrument case 370 has a generally central cylindrical chamber 370a therewithin rotationally receiving the generally cylindrical gimbal-shell 280a constituting the casing for the gimbal assembly. Within the gimbal member 280a are housed the gyroscopic motor 300 which in the example is of the electrically driven type energized through flexible conductors 300a leading into the casing through suitably sealed apertures as illustrated in Figure 6. The details of the gyroscopic element and of the manner of housing it within the gimbal assembly case 280a are not important to an understanding of the invention and are therefore omitted from the description. The gimbal assembly casing 280a is journaled on antifriction bearing elements 280b (Figure 6) to rotate on the gimbal axis $A_G$ perpendicular to the gyro spin axis $A_S$. The gimbal assembly centering springs 340 are in the form of helical springs (Figure 6) extending perpendicular to the plane of the paper in Figure 6 and fastened at one end to the casing 370 at suitable points (not shown) and at their opposite ends to anchor elements 280c on the gimbal-assembly casing. These two springs, preferably slightly preloaded, normally maintain the gimbal casing in a neutral position wherein the gyro spin axis $A_s$ is disposed horizontally assuming the instrument casing base 370b is intended to be secured to a horizontal surface or equivalent support, subject to turning in a horizontal plane at an unknown rate to be measured.

In order to provide working chambers 360c for the gimbal casing vanes 320 pockets are formed opening into opposite sides of the cylindrical cavity 370a and the radially outer surfaces of these pockets have a cylindrical contour concentric to the gimbal axis $A_g$. The vanes 320 project radially from gimbal 280a into these pockets and function therein as positive displacement pump elements by angular movement of the gimbal about its own axis. Pins 320a threaded upwardly into the vanes have projecting heads adapted to bear against the bottom surfaces of the respective pockets and serve as stops limiting angular displacement of the gimbal assembly within the casing 370.

The gyratory fluid passage 360 includes the upper branch 360a extending through a tube 370c connected at opposite ends to hollow elbow fittings 370d mounted on opposite sides of the casing 370 in registry with the upper ends of vertical bores 370e respectively formed in opposite sides of the casing. The lower ends of the bores 370e extend below the vane compartments 360c to be connected through inclined bores 370f to a point in such compartments beneath the respective vanes therein. Similarly, the vane compartments 360c, at locations above the top surfaces of the vanes are respectively connected through upwardly and outwardly inclined bores 370g to the upper ends of vertical bores 370h in the instrument casing forming part of the lower liquid passage branch 360b. The vertical bores 370h intersect the respective ends of a transverse cylindrical chamber 370i extending across the bottom of the casing. This cylindrical chamber receives the transducer mechanism to be described and furnishes a communicating passage through and around such transducer mechanism to complete the gyratory flow circuit for the mass of liquid contained in the casing.

The generally cylindrical chamber 370a opens into an adjoining chamber 370j occupied by the gimbal springs 340 and by some of the liquid with which the casing is filled to provide the gyratory liquid mass. This liquid is free to pass through openings 372a in the flanged plate 372 supported by the journal block 374a carrying one of the gimbal bearings 280b (Figure 6). The block 374a is formed as part of a bracket 374 mounted inside the casing by an annular flange 374b. The cover plate 376 secured by screws 376a to this same flange forms a chamber between its inside face and the outside face of plate 372 (Figures 3 and 6).

A flexible diaphragm 378 divides this chamber into inner and outer spaces sealed from each other. The outer space is in communication with the surrounding air through a central hole in the cover plate 376. The inner space, between the inside face of this flexible diaphragm and the journal plate 372, constitutes an expansion chamber for liquid within the instrument casing, permitting the casing to be filled completely with liquid and yet to avoid the possibility of damage to delicate parts such as the transducer float when temperature rises and causes expansion of such liquid.

The transducer assembly received within the transversely extending chamber 370i comprises the two coaxially aligned, annular differential transformer windings 420 and 440 encased in a holder shell 442 suitably retained in a generally central position inside the chamber 370i, as by the receptacle 444 having a fixed shoulder at its left end (Figure 4) and a threaded annular stop threaded in its right end (same figure). The transformer windings are connected to sets of electrical circuit conductors 430 by which the winding conductors are extended to the outside of the casing for connection to a suitable detecting circuit sensitive to differential voltage conditions developed in the differential transformer windings.

The central passage formed through the aligned differential transformer windings is occupied by a nonferromagnetic float tube 446 which is open at both ends and communicates with the ends of the chamber 370i. Supporting shims 448 are interposed between the exterior of the tube 446 and the differential transformer winding interiors to maintain the tube in fixed position relative to the windings and seal off any spaces between the tube and the windings against passage of liquid therethrough. A hollow float 450 of generally cylindrical form fits slidably inside the float tube 446 and, like such tube, is formed of nonferromagnetic material. A ferromagnetic sleeve 400 is sealed within the float 450 and serves as the movable core element of the differential transformer. The total weight of the float assembly, including the transducer core element 400, divided by the displacement volume thereof is substantially equal to the specific weight of the liquid, that is, the float is a neutral body in such liquid so that in any attitude of the instrument the float will assume substantially the same static position lengthwise of the float tube 446 under a given set of operating conditions.

Recentering springs 460 respectively connected to opposite ends of the float extend to fixed supports 462 anchored to the casing and tend to hold the transducer in its neutral position wherein the magnetic effect of the core element 400 on the two transformer windings is equal. Displacement of the float, hence of the core element, to the right or to the left increases the magnetic inductance of the right or left winding (Figure 4) and decreases that of the other winding by a corresponding amount, hence produces unbalance voltages in the output circuit (not shown) connected to the leads 430, which unbalance may be detected as a measure of the angular rate input to the gyro instrument.

While, as in a conventional rate gyro, or as in the theoretical example first described herein, the transducer may be coupled directly to the gimbal assembly, in the preferred embodiment as shown in Figures 2 through 7 it is possible, since the liquid deflection is proportional to the input rate, to utilize the measurement of the motion of liquid as the input rate indication, which thereby allows utilization of conventionally unacceptable transducer types and affords greater flexibility in pass band control. The by-pass passage corresponding to the passage 36b" in Figure 2 is formed in parallel branches 360b", comprising the respective grooves 370m (Figure 6) extending lengthwise of the chamber 370i along opposite sides of the differential transformer coils, so as to furnish communication paths between opposite end portions of said chamber. The size of these by-pass passages determines the lower break frequency in the pass band characteristic of the instrment. As the input rate frequency applied to the instrument case about the input axis $A_r$ increases from zero frequency, the effect of the by-pass passages 360b" and the centering springs 460 decreases, and the float becomes coupled more positively to the liquid hence tends to follow the motion of the liquid more faithfully. The upper cut-off frequency of the instrument is determined by the resultant natural period of the gimbal assembly and gyratory liquid mass counterrotationally coupled thereto by means of the vanes. Above the natural frequency the responsiveness of the instrument to indicate changes in input rate drops off rapidly as a function of increasing input rate frequency.

In addition to permitting low-frequency rejection as described above, the use of liquid as the gyratory mass counterrotationally coupled to the gimbal assembly has the further advantage of preventing a biased output as a result of changes in the gimbal's null position. This is due to the lack of direct mechanical coupling between the gimbal and the transducer. Gimbal spring hysteresis is normally one cause of a biased output in conventional rate gyros. However, the disclosed method of coupling the transducer to the gimbal assembly does introduce a slight sensitivity in the instrument to angular acceleration about the gimbal axis to the extent that the lack of perfect coupling between the vanes and the liquid does allow some flow past the vanes. In this respect the embodiment described as the preferred embodiment is somewhat less efficient than the simple theoretical form disclosed in Figure 1. Nevertheless, the resultant angular acceleration sensitivity of the instrument utilizing the gyratory liquid mass is still much less than that obtaining in conventional rate gyros.

Another distinct advantage of liquid as the gyratory mass is the self-damping characteristic of that form of instrument. The viscosity of the liquid, which is preferably an oil such as a silicone oil, may be chosen so that the viscous drag provides the desired degree of damping; alternatively, the liquid passage may be provided with a suitable flow restriction such as the adjustably insertable plug screw 451 penetrating one of the vertical bores 370h to restrict flow of liquid in the circuit. Moreover, since in this case the gimbal is in the form of a hermetically sealed cylindrical shell or can, closely fitting the interior of the instrument cavity 370a, there is a certain amount of viscous shear between the exterior surface of the gimbal shell and the interior of the chamber which also adds to the damping factor. In the illustrated case approximately 30% of the damping is attributable to the shear effect whereas the remaining 70% is due to the viscous restraint to flow through the liquid passage 360 when the plug screw 451 is fully retracted from the liquid flow path.

It is desirable for reasons of accuracy that the instrument be statically balanced in all attitudes which it may assume. This applies to the gimbal assembly as well as to the transducer float assembly. For the same reason it is likewise desirable that the instrument of Figures 2 through 7 be operated at a given substantially constant temperature so that the movable parts displace the same weight of liquid at all times.

These and other aspects of the invention and of the mode of practicing the same will be apparent to those skilled in the art.

We claim as our invention:

1. In a rate gyro the combination comprising an instrument base adapted to be mounted on a support subject to turning about a rate input axis at a rate to be measured by the gyro, a gimbal assembly including gimbal means pivotally mounted on said base for precessional deflection relative thereto about a gimbal axis substantially perpendicular to said rate input axis, said gimbal assembly further including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said rate input axis, antiprecession spring means connected between said gimbal assembly and said base, yieldably restraining said gimbal assembly against precessional deflection thereof about said gimbal axis from the normal position of said gimbal assembly, a gyratory mass separate from said gimbal assembly and comprising a liquid mass fluid casing means on said base supporting said separate gyratory liquid mass in a manner permitting free gyratory movement of said mass relative to said base about a gyrational axis disposed substantially parallel to said gimbal axis, said fluid casing means forming a substantially continuous gyratory path for said liquid mass, and means counter-rotationally coupling said gyratory liquid mass positively to said gimbal assembly to exert the inertial torque of said gyratory mass compensatively against the inertial torque of said gimbal assembly, both caused by angular acceleration of said instrument base about said gimbal axis, said counter-rotational coupling means comprising positive displacement means including coacting pump elements fixed respectively to the base and to the gimbal assembly, one of said elements comprising a passage formed in said fluid casing means and containing a portion of said liquid mass serially arranged in said gyratory path and the other of said elements comprising a positive liquid displacement member slidably fitted in said passage and fixed to the gimbal assembly to force liquid around said path by precessional deflection of said gimbal assembly relative to said base, said separate gyratory liquid mass and said gimbal assembly having respectively predetermined moments of inertia, and said coupling means having a predetermined mechanical advantage with respect to the exertion of inertial torque of the gyratory mass on said gimbal assembly, said antiprecession spring means having a predetermined spring constant related both to said mechanical advantage and to said respective moments of inertia, thereby to establish a predetermined natural frequency for said gyratory mass and gimbal assembly selected independently of gimbal deflection rate as a function of precessional torque.

2. The rate gyro defined in claim 1, wherein the mechanical advantage of the said coupling means is substantially equal to the ratio of the said moment of inertia of the gyratory mass divided by the said moment of inertia of the gimbal assembly.

3. In a rate gyro the combination comprising an instrument base adapted to be mounted on a support subject to turning about a rate input axis at a rate to be measured by the gyro, a gimbal assembly including gimbal means pivotally mounted on said base for precessional deflection relative thereto about a gimbal axis substantially perpendicular to said rate input axis, said gimbal assembly further including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said rate input axis, antiprecession means yieldably restraining said gimbal assembly against precessional deflection thereof about said gimbal axis with a restraining force increasing progressively with such deflection from the normal position of said gimbal assembly, a gyratory mass of liquid, means on said base encasing said liquid in a substantially continuous gyratory path disposed about a gyrational axis extending substantially parallel to said gimbal axis, and means counter-rotationally coupling said gyratory mass of liquid to said gimbal assembly to exert the inertial torque of said gyratory mass compensatively against the inertial torque of said gimbal assembly both caused by angular acceleration of said instrument base about said gimbal axis, said counter-rotational coupling means comprising positive displacement pump means including coacting pump elements fixed respectively to the base and to the gimbal assembly, one of said elements comprising a passage formed in said fluid casing means and containing a portion of said liquid mass serially arranged in said gyratory path and the other of said elements comprising a positive liquid displacement member slidably fitted in said passage and fixed to the gimbal assembly to force liquid around said path by precessional deflection of said gimbal assembly relative to said base.

4. The rate gyro defined in claim 3, and transducer means including a float member disposed in the gyratory path of the liquid mass to be displaced by and with gyrational motion of said liquid around said path, a transducer element carried by said float member, a cooperating transducer element fixedly mounted in the casing means to produce an output response proportional to relative displacement between said transducer elements, and resilient float-return means interconnecting said float and said casing means, yieldably opposing movement of said float.

5. The rate gyro defined in claim 4, wherein the casing means includes a by-pass around the float permitting restricted flow of liquid around said float, whereby low-frequency rates of change in the motion of the liquid in the gyratory path thereof do not appreciably displace the float against the force of the resilient float-return means.

6. The rate gyro defined in claim 5, wherein the float and transducer element carried thereby displace a body of the liquid substantially equal in weight to the combined weight of such float and transducer element.

7. The rate gyro defined in claim 6, wherein the positive liquid displacement member comprises a vane projecting fixedly from the gimbal means to rotate therewith about the gimbal axis, and the liquid passage slidably fitted by said vane is joined to the remainder of the gyratory liquid path through direction-reversing sections of said path by which flow of liquid in one direction around said path produces pressure differentials on respectively opposite sides of said vane in a sense tending to produce rotation of the gimbal assembly in the relatively opposite sense about the gimbal axis.

References Cited in the file of this patent
UNITED STATES PATENTS

| | | |
|---|---|---|
| 1,880,994 | Sperry | Oct. 4, 1932 |
| 2,595,268 | Kellogg | May 6, 1952 |
| 2,709,921 | Sylvan | June 7, 1955 |